United States Patent
Ravikumar et al.

(10) Patent No.: US 12,227,416 B2
(45) Date of Patent: *Feb. 18, 2025

(54) PRE-COMBUSTION CO2 REMOVAL IN A NATURAL GAS FED STEAM METHANE REFORMER (SMR) BASED HYDROGEN PLANT

(71) Applicant: Fluor Technologies Corporation, Irving, TX (US)

(72) Inventors: Ravi Ravikumar, Lancaster, CA (US); Sunil Singhal, Gurugram (IN)

(73) Assignee: FLUOR TECHNOLOGIES CORPORATION, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,608

(22) Filed: Oct. 13, 2022

(65) Prior Publication Data
US 2023/0042038 A1 Feb. 9, 2023

Related U.S. Application Data

(63) Continuation of application No. 17/176,050, filed on Feb. 15, 2021, now Pat. No. 11,505,462.

(51) Int. Cl.
*C01B 3/48* (2006.01)
*B01D 53/047* (2006.01)
(Continued)

(52) U.S. Cl.
CPC .............. *C01B 3/48* (2013.01); *B01D 53/047* (2013.01); *B01D 53/1418* (2013.01);
(Continued)

(58) Field of Classification Search
CPC .. C01B 3/48; C01B 3/52; C01B 3/506; C01B 3/56; C01B 2203/0233; C01B 2203/0283;
(Continued)

(56) References Cited

U.S. PATENT DOCUMENTS

| | | | |
|---|---|---|---|
| 6,551,380 B1 * | 4/2003 | Reddy | B01D 53/1437 95/94 |
| 6,921,597 B2 | 7/2005 | Keefer | |

(Continued)

FOREIGN PATENT DOCUMENTS

| | | |
|---|---|---|
| EP | 2233433 A1 | 9/2010 |
| GB | 2592695 A | 8/2021 |

(Continued)

OTHER PUBLICATIONS

International Search Report and Written Opinion dated Jun. 22, 2022, International Patent Application No. PCT/US2022/016468 filed Feb. 15, 2022.

(Continued)

*Primary Examiner* — Wayne A Langel
*Assistant Examiner* — Syed T Iqbal
(74) *Attorney, Agent, or Firm* — Andrew M. Metrailer; Conley Rose, P.C.

(57) ABSTRACT

In a hydrocarbon-fed steam methane reformer hydrogen-production process and system, carbon dioxide is recovered in a pre-combustion context, and optionally additional amounts of carbon dioxide are recovered in a post-combustion carbon dioxide removal, to provide the improved carbon dioxide recovery or capture disclosed herein.

13 Claims, 2 Drawing Sheets

(51) Int. Cl.
| | |
|---|---|
| *B01D 53/14* | (2006.01) |
| *B01D 53/26* | (2006.01) |
| *B01D 53/62* | (2006.01) |
| *B01D 53/78* | (2006.01) |
| *B01D 53/96* | (2006.01) |
| *B01J 19/24* | (2006.01) |
| *C01B 3/50* | (2006.01) |
| *C01B 3/52* | (2006.01) |
| *C01B 3/56* | (2006.01) |

(52) U.S. Cl.
CPC ..... *B01D 53/1425* (2013.01); *B01D 53/1475* (2013.01); *B01D 53/265* (2013.01); *B01D 53/62* (2013.01); *B01D 53/78* (2013.01); *B01D 53/96* (2013.01); *B01J 19/245* (2013.01); *C01B 3/506* (2013.01); *C01B 3/52* (2013.01); *C01B 3/56* (2013.01); *B01D 2252/204* (2013.01); *B01D 2257/104* (2013.01); *B01D 2257/504* (2013.01); *B01D 2257/80* (2013.01); *B01J 2219/0004* (2013.01); *C01B 2203/0233* (2013.01); *C01B 2203/0283* (2013.01); *C01B 2203/0415* (2013.01); *C01B 2203/042* (2013.01); *C01B 2203/047* (2013.01); *C01B 2203/0475* (2013.01); *C01B 2203/048* (2013.01); *C01B 2203/0495* (2013.01); *C01B 2203/0883* (2013.01); *C01B 2203/1241* (2013.01); *C01B 2203/1294* (2013.01); *C01B 2203/148* (2013.01)

(58) Field of Classification Search
CPC ...... C01B 2203/042; C01B 2203/0415; C01B 2203/0475; C01B 2203/047; C01B 2203/048; C01B 2203/0495; C01B 2203/1241; C01B 2203/148; C01B 2203/0883; C01B 2203/1294; C01B 3/384; B01J 19/245; B01J 2219/0004; B01J 8/065; B01J 2208/0053; B01J 2208/065; B01D 53/1475; B01D 53/1418; B01D 53/047; B01D 53/265; B01D 53/62; B01D 53/78; B01D 53/96; B01D 53/1425; B01D 2257/80; B01D 2252/204; B01D 2257/104; B01D 2257/504; B01D 2256/20; Y02C 20/40
See application file for complete search history.

(56) References Cited

U.S. PATENT DOCUMENTS

| | | | |
|---|---|---|---|
| 8,580,153 | B2 | 11/2013 | Vauk et al. |
| 9,327,972 | B2 | 5/2016 | Allam |
| 11,505,462 | B2* | 11/2022 | Ravikumar ........ B01D 53/1425 |
| 2003/0138687 | A1 | 7/2003 | Lio |
| 2004/0182002 | A1 | 9/2004 | Malhotra |
| 2004/0256116 | A1 | 12/2004 | Olsvik |
| 2005/0074642 | A1 | 4/2005 | Foger |
| 2005/0178063 | A1 | 8/2005 | Reinke |
| 2007/0212295 | A1* | 9/2007 | Woods ................ C01B 3/48 |
| | | | 422/600 |
| 2007/0227352 | A1* | 10/2007 | Kumar ................ C01B 3/56 |
| | | | 95/96 |
| 2010/0028243 | A1 | 2/2010 | Wang |
| 2010/0074839 | A1 | 3/2010 | Drnevich et al. |
| 2010/0254893 | A1* | 10/2010 | Kim ................ C01B 3/48 |
| | | | 423/655 |
| 2010/0288123 | A1* | 11/2010 | Chen ................ C01B 3/501 |
| | | | 95/93 |
| 2011/0158900 | A1 | 6/2011 | MacArthur et al. |
| 2011/0200520 | A1 | 8/2011 | Ramkumar |
| 2012/0039794 | A1 | 2/2012 | Catchpole |
| 2012/0118011 | A1 | 5/2012 | Terrien et al. |
| 2012/0141367 | A1 | 6/2012 | Wynn |
| 2013/0000320 | A1 | 1/2013 | McKenna et al. |
| 2013/0180258 | A1 | 7/2013 | Robels Macias |
| 2015/0038599 | A1 | 2/2015 | Kresnyak |
| 2016/0256820 | A1 | 9/2016 | Kulkarni |
| 2017/0204335 | A1* | 7/2017 | Ravikumar ........... C01B 3/38 |
| 2017/0218279 | A1 | 8/2017 | Ravikumar et al. |
| 2019/0135626 | A1 | 5/2019 | Rafati et al. |
| 2021/0188632 | A1* | 6/2021 | Lim ................ C01B 3/346 |
| 2022/0259042 | A1 | 8/2022 | Ravikumar et al. |
| 2022/0267147 | A1 | 8/2022 | Ravikumar et al. |
| 2022/0352721 | A1 | 11/2022 | Scheiff |

FOREIGN PATENT DOCUMENTS

| | | |
|---|---|---|
| WO | 2005009892 A2 | 2/2005 |
| WO | 2019162236 A1 | 8/2019 |
| WO | 2020031063 A1 | 2/2020 |
| WO | 2020221642 A1 | 11/2020 |
| WO | 2022038089 A1 | 2/2022 |
| WO | 20220174195 A1 | 8/2022 |
| WO | 20220178439 A1 | 8/2022 |

OTHER PUBLICATIONS

International Search Report and Written Opinion dated Jul. 19, 2022, International Patent Application No. PCT/US2022/017352 filed Feb. 22, 2022.
Ravikumar, Ravi et al., "Natural Gas Fed Steam Methane Reformer (SMR) Based Hydrogen Plant," filed Feb. 22, 2021, U.S. Appl. No. 63/151,867.
Corrected Notice of Allowability dated Aug. 11, 2022, U.S. Appl. No. 17/176,050, filed Feb. 15, 2021.
Notice of Allowance dated Jul. 20, 2022, U.S. Appl. No. 17/176,050, filed Feb. 15, 2021.
Office Action dated Jun. 10, 2022, U.S. Appl. No. 17/176,050, filed Feb. 15, 2021.
Invitation To Pay Additional Fees And, Where Applicable, Protest Fee, dated May 17, 2022, International Patent Application No. PCT/US2022/017352 filed Feb. 22, 2022.
Office Action dated Sep. 15, 2023, U.S. Appl. No. 17/677,805, filed Feb. 22, 2022.
Final Office Action dated May 7, 2024, U.S. Appl. No. 17/677,805, filed Feb. 22, 2022.
Advisory Action dated Jul. 18, 2024, U.S. Appl. No. 17/677,805, filed Feb. 22, 2022.
International Preliminary Report on Patentability dated Aug. 24, 2023, International Patent Application No. PCT/US2022/016468 filed Feb. 15, 2022.
Rule 161(2) and 162 Communication dated Sep. 27, 2023, European Application No. 22753530.9 filed Sep. 12, 2023.
International Preliminary Report on Patentability dated Aug. 31, 2023, International Patent Application No. PCT/US2022/017352 filed Feb. 22, 2022.
Office Action dated Jan. 24, 2024, U.S. Appl. No. 17/677,805, filed Feb. 22, 2022.
Rule 161(2) and 162 Communication dated Sep. 29, 2023, European Application No. 22710228.2 filed Sep. 12, 2023.

\* cited by examiner

PRE-COMBUSTION CO2 REMOVAL IN A NATURAL GAS FED STEAM METHANE REFORMER (SMR) BASED HYDROGEN PLANT

CROSS-REFERENCE TO RELATED APPLICATIONS

This application is a continuation of and claims priority to U.S. patent application Ser. No. 17/176,050 filed on Feb. 15, 2021 to Ravikumar et al, and entitled "Pre-Combustion $CO_2$ Removal in a Natural Gas Fed Steam Methane Reformer (SMR) Based Hydrogen Plant," which is incorporated herein by reference in its entirety.

TECHNICAL FIELD

The present disclosure relates to processes for producing hydrogen from natural gas.

BACKGROUND

Currently, a majority of the hydrogen production is accomplished using natural gas. Carbon dioxide ($CO_2$) can be present as part of the natural gas fed to the hydrogen production plant, and $CO_2$ will also be generated within the plant (e.g., in a unit where reforming and water gas shift occur). Because carbon dioxide ($CO_2$) is the main greenhouse gas that is targeted for reduction by various governments and various emissions programs, there is an ongoing need for the development of techniques for reducing carbon dioxide emissions.

SUMMARY

A process for producing hydrogen from natural gas, the process comprising: introducing a feed natural gas, a feed steam, and a fuel to a steam methane reformer to produce unshifted synthesis gas (syngas); introducing the unshifted syngas to a water gas shift unit to produce a shifted syngas removing $CO_2$ from the shifted syngas to produce a $CO_2$ depleted syngas and a $CO_2$ product; introducing the $CO_2$ depleted syngas to a pressure swing absorption unit to produce a hydrogen product and an off-gas comprising carbon monoxide, carbon dioxide, unreacted methane, and at least 25 mol % hydrogen based on a total moles of components in the off-gas, wherein the fuel that is introduced to the steam methane reformer comprises the off-gas.

A process for producing hydrogen from natural gas, the process comprising: introducing a teed natural gas, a feed steam, and a fuel to a steam methane reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing absorption unit to produce a hydrogen product; before removing $CO_2$ from the shifted syngas, cooling the shifted syngas in a heat exchanger to remove an aqueous condensate from the shifted syngas; removing the aqueous condensate from a shifted syngas side of the heat exchanger; introducing the aqueous condensate to a coolant side of the heat exchanger; and producing a heat exchanger steam in the heat exchanger, wherein the heat exchanger steam is the feed steam that is introduced to the steam methane reformer.

A hydrogen production system comprising: a steam methane reformer configured to contact methane and steam with a catalyst to form an unshifted syngas; a water gas shift unit coupled to the steam methane reformer and configured to receive the unshifted syngas from the steam methane reformer and to produce a shifted syngas; an absorption unit coupled to the water gas shift unit and configured to receive the shifted syngas, remove carbon dioxide from the shifted syngas, and produce a $CO_2$ depleted syngas and a $CO_2$ product a pressure swing absorption unit coupled to the absorption unit, wherein the pressure swing absorption unit is configured to receive the $CO_2$ depleted syngas from the absorption unit and to produce a hydrogen product and an off-gas; and an off-gas stream coupled to the pressure swing absorption unit and to the steam methane reformer, wherein the off-gas stream is configured to receive the off-gas from the pressure swing absorption unit and to introduce the off-gas to the steam methane reformer, wherein the off-gas in the off-gas stream comprises carbon monoxide, carbon dioxide, unreacted methane, and at least 25 mol % hydrogen based on a total moles of components in the off-gas stream.

A hydrogen production system comprising: a steam methane reformer configured to contact methane and steam with a catalyst to form an unshifted syngas; a water gas shift unit coupled to the steam methane reformer and configured to receive the unshifted syngas from the steam methane reformer and to produce a shifted syngas; a heat exchanger coupled to the water gas shift unit and to the steam methane reformer, wherein the heat exchanger is configured to receive the shifted syngas from the water gas shift unit, to cool the shifted syngas, to remove an aqueous condensate from the shifted syngas, and to provide the shifted syngas without the aqueous condensate for introduction to an absorption unit; the absorption unit coupled to the water gas shift unit and the heat exchanger and configured to receive the cooled shifted syngas, remove carbon dioxide from the shifted syngas, and produce a $CO_2$ depleted syngas and a $CO_2$ product; a pressure swing absorption unit coupled to the absorption unit, wherein the pressure swing absorption unit is configured to receive the $CO_2$ depleted syngas from the absorption unit and to produce a hydrogen product and an off-gas; and a coolant stream having an end coupled to a shifted syngas side of the heat exchanger and an opposite end coupled to a coolant side of the heat exchanger, wherein the coolant stream is configured to remove the aqueous condensate from the shifted syngas side of the heat exchanger and to introduce the aqueous condensate to the coolant side of the heat exchanger, wherein the heat exchanger is configured to heat the aqueous condensate to produce a heat exchanger steam, wherein the heat exchanger steam is fed to the steam methane reformer.

The above processes and systems can have a carbon capture of about 60%. When used in conjunction with a flue gas treatment process and system having carbon dioxide removal, where a splitter can be adjusted to control how much flue gas flows to another absorption unit for carbon dioxide removal from the flue gas, the carbon recovery of the combined process and system can range from about 60% to about 95%. The flue gas treatment process and system can also include another pressure swing absorption unit to produce an $O_2$ product and a $N_2$ product. The $O_2$ product recovered by the flue gas treatment process and system can be fed to the steam methane reformer. The $N_2$ product can be have nitrogen purity suitable for use in another part of the plant where the processes and systems disclosed herein are located.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

DETAILED DESCRIPTION

Figure 1:
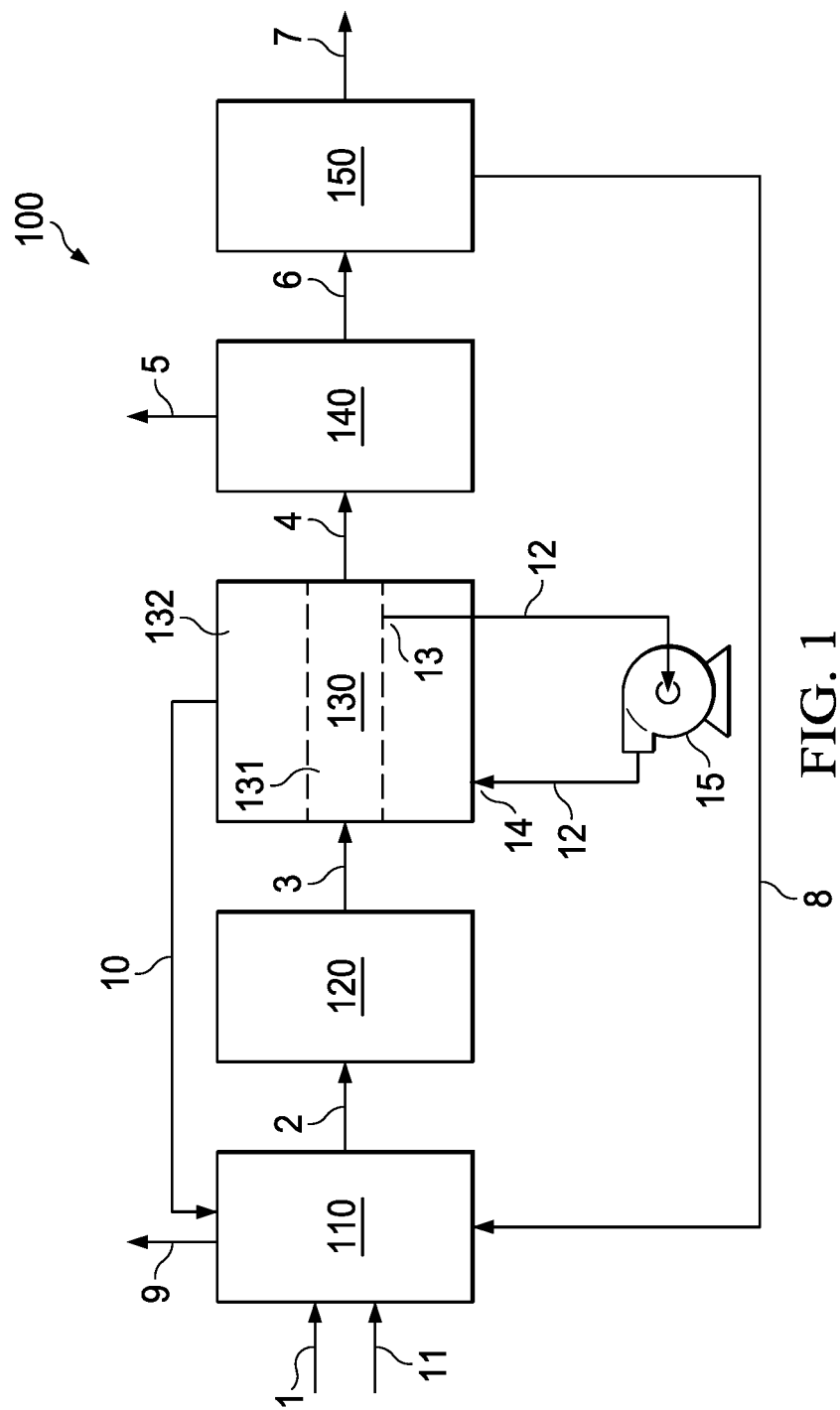
FIG. 1 illustrates a process and system for producing hydrogen from natural gas.

It should be understood at the outset that although an illustrative implementation of one or more embodiments are provided below, the disclosed process and system may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

The recitation of ranges of values herein is merely intended to serve as a shorthand method of referring individually to each separate value falling within the range. Unless otherwise indicated herein, each individual value is incorporated into the specification as if it were individually recited herein. All processes described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment.

Disclosed herein is a process and system for producing hydrogen from natural gas that has cost effective carbon capture. To accomplish this, carbon dioxide is removed in a pre-combustion context, in that, the process and system separate carbon dioxide from a shifted syngas, and use a hydrogen enriched off-gas stream derived from pressure swing absorption of the shifted syngas as fuel for combustion in a steam methane reformer, in place of a natural gas fuel. The pre-combustion context is relative to carbon dioxide removal in a post-combustion context, e.g., where carbon dioxide is removed from the flue gas emitted from a steam methane reformer, after combustion of fuel in the steam methane reformer. The disclosed process and system has further improved carbon capture when optionally using the post-combustion carbon dioxide removal technique disclosed herein, which separates carbon dioxide from the flue gas emitted by the steam methane reformer.

In the pre-combustion context disclosed herein, separation of carbon dioxide from the shifted syngas reduces the amount of carbon dioxide in the off-gas of the pressure swing absorption (PSA) unit that is fed as fuel to the steam methane reformer. This means that when using PSA off-gas as fuel as disclosed herein, the carbon dioxide is present in off-gas recycle only in residual amounts (compared to no carbon dioxide recovery), so the heat duty of the steam methane reformer 110 needed for heating carbon dioxide in addition to other components is reduced, which reduces the fuel needed to heat the steam methane reformer 110 to maintain operating temperature. Moreover, the carbon dioxide that would be passed through to the flue gas of the steam methane reformer is reduced to residual amounts.

Using the hydrogen rich stream (hydrogen enriched PSA off-gas) as fuel in place of a hydrocarbon fuel reduces the amount of carbon dioxide generated due to fuel combustion because a smaller amount of hydrocarbon fuel is used. Combustion of hydrogen produces no carbon dioxide; thus, the flue gas that flows from the steam methane reformer contains less carbon dioxide (compared with using hydrocarbon-based fuels). The off-gas of the PSA unit can contain greater than 50 mol % hydrogen. Carbon dioxide that can be generated by other components of the off-gas in the steam methane reformer, and any carbon dioxide residually contained in the PSA off-gas that passes through the steam methane reformer, can flow from the steam methane reformed in the flue gas and optionally be captured from the flue gas by a flue gas treatment system. Carbon capture according to the process described herein can be improved over existing techniques to be in a range of from about 60% to about 95%.

Figure 2:
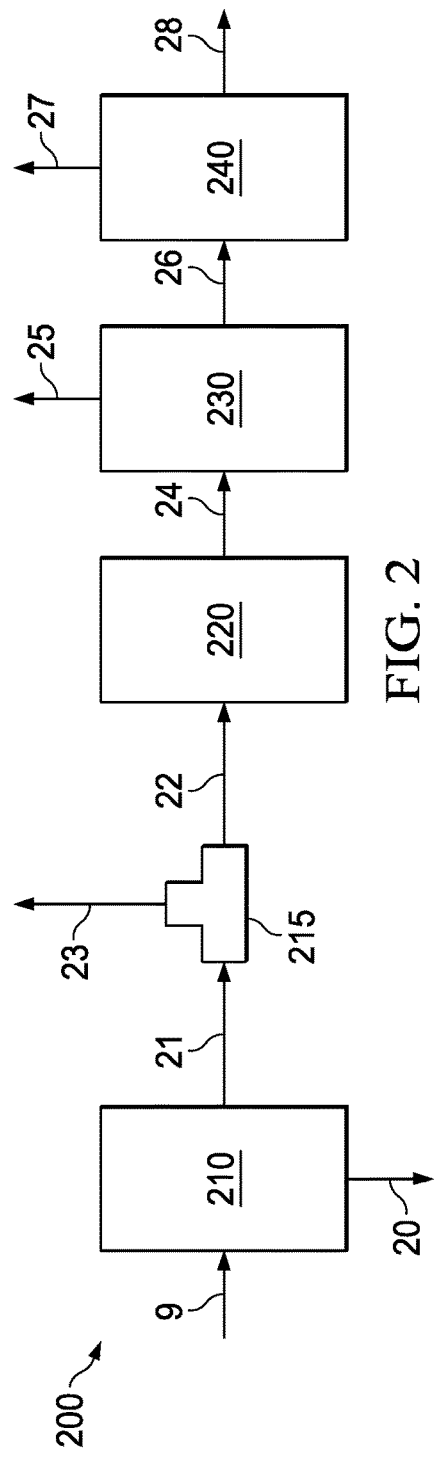
FIG. 2 illustrates a process and system for treating the flue gas produced in FIG. 1.

The process described herein can be implemented using the system 100 of FIG. 1. The system 100 includes a steam methane reformer 110; a water gas shift unit 120; a shifted syngas cooling unit 130; an absorption unit 140; and a pressure swing absorption (PSA) unit 150. The system 100 can optionally include the flue gas treatment system 200 in FIG. 2. In FIG. 2, the flue gas treatment system 200 can include a cooling unit 210, a compression unit 220, a carbon dioxide recovery unit 230, and a pressure swing absorption (PSA) unit 240. As will be appreciated by one of skill in the art, and with the help of this disclosure, components of the hydrogen production system can be in fluid communication with each other through any suitable conduits (e.g., pipes, streams, etc.).

The process of FIG. 1 can include introducing natural gas and steam to the steam methane reformer 110 to produce an unshifted synthesis gas (syngas).

In aspects, the natural gas in stream 1 can include methane and one or more of $C_2$+ hydrocarbons (e.g., ethane, propane, butanes, pentanes, or combinations thereof), nitrogen, carbon dioxide, and contaminants (e.g., sulfur-containing compounds, chlorides, water vapor, or combinations thereof). It is contemplated that the natural gas in stream 1 can be pre-treated to remove sulfur-containing compounds (e.g., hydrogen sulfide, carbon sulfide, carbonyl sulfide, carbon disulfide, organic sulfur compounds, or combinations thereof) to a level acceptable to avoid poisoning of the catalyst in the steam methane reformer 110. In aspects, the concentration of contaminants in stream 1 is less than about 1 part per million volume (ppmv), alternatively less than about 0.5 ppmv, or alternatively less than about 0.1 ppmv. In some aspects, the concentration of sulfur-containing compounds in stream 1 is less than about 1 part per million volume (ppmv), alternatively less than about 0.5 ppmv, or alternatively less than about 0.1 ppmv. In some aspects, the concentration of hydrogen sulfide in stream 1 is less than about 1 part per million volume (ppmv), alternatively less than about 0.5 ppmv, or alternatively less than about 0.1 ppmv.

In aspects, steam can be introduced into the steam methane reformer 110 via stream 11, via stream 10, and optionally via stream 1. In an embodiment, a molar ratio of steam to methane in the total feed streams to the steam methane reformer 110 can be from about 0.5:1 to about 4.0:1, alternatively from about 0.75:1 to about 3.0:1, or alternatively from about 0.8:1 to about 2.5:1. In an embodiment, a molar ratio of steam to methane in the total feed streams to the steam methane reformer 110 can be from about 0.5:1 to about 1.0:1, alternatively from about 0.6:1 to about 0.9:1, or alternatively from about 0.65:1 to about 0.85:1, for a sulfur passivated nickel-based catalyst in the steam methane reformer 110. In an embodiment, a molar ratio of steam to methane in the total feed streams to the steam methane reformer 110 can be from about 2.5:1 to about 4.0:1, alternatively from about 2.75:1 to about 3.75:1, or alternatively from about 3.0:1 to about 3.5:1, for a sulfur sensitive nickel-based catalyst in the steam methane reformer 110.

In an embodiment, a molar ratio of carbon dioxide to methane in the total feed streams to the steam methane reformer 110 can be from about 0.5:1 to about 1.5:1, alternatively from about 0.5:1 to about 1.0:1, or alternatively from about 1.0:1 to about 1.5:1. In an embodiment, a process of producing fuel from carbon dioxide avoids separating the carbon dioxide from the natural gas prior to introducing the natural gas to the steam methane reformer 110. In an embodiment, a process of producing fuel from carbon dioxide excludes separating at least a portion of the carbon dioxide from the natural gas prior to introducing the natural gas to the steam methane reformer 110. Generally, in conventional reforming processes, at least a portion of the carbon dioxide can be separated (e.g., removed) from a feedstock introduced to a reforming unit, as the carbon dioxide lowers the molar ratio of hydrogen to carbon monoxide. Carbon dioxide can be converted to carbon monoxide in the presence of hydrogen, according to the general reaction $CO_2 + H_2 \rightleftharpoons CO + H_2O$. In an embodiment, the steam methane reformer 110 as disclosed herein can employ carbon dioxide as part of a feedstock introduced to steam methane reformer 110 (when compared to conventional steam reforming processes), in order to produce a syngas (e.g., unshifted syngas) having a molar ratio of hydrogen to carbon monoxide of about 2:1. Converting carbon dioxide to carbon monoxide lowers the molar ratio of hydrogen to carbon monoxide both by consuming hydrogen and producing carbon monoxide. Further, the presence of carbon dioxide can lead to an additional methane reforming reaction as represented by the general reaction $CH_4 + CO_2 \rightleftharpoons 2CO + 2H_2$, which in turn can lower the molar ratio of hydrogen to carbon monoxide in the syngas (e.g., unshifted syngas) by producing hydrogen and carbon monoxide in equimolar amounts.

The steam methane reformer 110 can include one or more vessels containing a catalyst. The steam methane reformer 110 can generally include a reaction side and a heating side, wherein heat derived from combustion of a fuel on the heating side is used to supply heat on the reaction side where the methane reforming reaction occurs. For example, a vessel for the steam methane reformer 110 can contain one or more tubes loaded with catalyst, where the interior of the tubes is the reaction side of the steam methane reformer 110, and each tube is fluidly connected with streams 1, 2, and 11; while, the outer surface of the tubes is considered to be on the heating side of the steam methane reformer 110 and is subjected to heat generated from combustion of a fuel that is fed to and combusted on the heating side of the steam methane reformer 110.

The steam methane reformer 110 is configured to contact the feed natural gas receive via stream 1 with the catalyst to produce the unshifted syngas (e.g., on the reforming reaction side of the steam methane reformer 110). In embodiments, the catalyst of the steam methane reformer 110 can include a sulfur passivated nickel-based catalyst. Methane can be reformed (e.g., converted to syngas or unshifted syngas) in the presence of water (e.g., steam) according to the general reaction $CH_4+H_2O \rightleftharpoons CO+3H_2$. The CO made in the reaction can also be converted to $CO_2$ in the steam methane reformer 110, by the reaction in the presence of water (e.g., steam) according to the general reaction $CO+H_2O \rightleftharpoons CO_2+H_2$. Conventional steam methane reformers use a steam to methane molar ratio of from about 2.5:1 to about 4.0:1, resulting in a syngas with a molar ratio of hydrogen to carbon monoxide of about 3:1, or higher. In an embodiment, the steam methane reformer 110 as disclosed herein can employ a low steam to methane ratio of 0.5 to 2.0 (when compared to conventional steam reforming processes) due to the presence of $CO_2$ in the feed gas, in order to produce a syngas (e.g., unshifted syngas) having a molar ratio of hydrogen to carbon monoxide of about 2:1.

In an embodiment, the steam methane reformer 110 can comprise any suitable reactor, such as for example a tubular reactor, a multitubular reactor, and the like, or combinations thereof. In an embodiment, the steam methane reformer 110 can comprise a MIDREX reformer, which is commercially available from Midrex Technologies, Inc. In an embodiment, the steam methane reformer 110 can have a nickel-based catalyst (e.g., sulfur sensitive nickel-based catalyst) and/or a sulfur passivated nickel-based catalyst (to avoid carbon depositions) contained therein. Methane reforming (according to the general reaction $CH_4+H_2O \rightleftharpoons CO+3H_2$) is strongly endothermic, and a reaction rate depends on the temperature, pressure and catalyst type. Methane will undergo the reforming reaction at high temperatures; however, in the presence of a catalyst (e.g., nickel-based catalyst), the temperature at which methane can be reformed can be lowered. In an embodiment, the steam methane reformer 110 can comprise one or more catalyst filled tubes (e.g., nickel-based catalyst filled tubes). In an embodiment, methane reforming can take place in catalyst filled tubes (e.g., nickel-based catalyst filled tubes). In such embodiment, the catalyst filled tubes can be heated indirectly, such as for example by burning a steam methane reformer fuel inside a reactor (e.g., fire box, furnace, etc.) comprising the catalyst filled tubes (e.g., a tube-filled furnace).

In aspects of this disclosure, the fuel include the off-gas of the pressure swing absorption unit 150 in system 100 (via stream 8 from the PSA unit 150, discussed in more detail below). When embodied as the off-gas from the PSA unit 150, the steam methane reformer fuel can include carbon monoxide, carbon dioxide, methane, hydrogen, and water vapor. In additional or alternative aspects, the off-gas stream 8 of the pressure swing absorption unit 150 is the only fuel stream that is fed to the steam methane reformer 110 during steady state operation (e.g., the fuel to the steam methane reformer 110 consists of the off-gas from the pressure swing absorption unit 150).

In aspects, the amount of hydrogen in the steam methane reformer fuel that is fed to the steam methane reformer 110 can be greater than 30, 35, 40, 45, or 50 mol % based on a total moles of components in the fuel that is fed to the steam methane reformer 110. In additional aspects, the amount of carbon dioxide in the steam methane reformer fuel (e.g., in off-gas stream) can be less than 60, 55, 50, 45, 40, 35, 30, 25, 20, 15, 10, 5, 4, or 3 mol % based on a total moles of components in the fuel that is fed to the steam methane reformer 110. In additional aspects, the amount of methane (e.g., in the form of unreacted methane passing through the system 100 to the off-gas of the PSA unit 150) in the steam methane reformer fuel that is fed to the steam methane reformer 110 can be greater than 10, 15, 20, 25, 30, 35, or 40 mol % based on a total moles of components in the fuel that is fed to the steam methane reformer 110.

In some aspects, it should be understood that a natural gas fuel may be used to startup the steam methane reformer 110 during startup of the system 100; however, upon reaching steady state with the improved hydrogen and carbon dioxide concentrations in the off-gas stream 8 of the pressure swing absorption unit 150, the natural gas fuel may be discontinued for steady state operation, and the hydrogen in the off-gas stream 8 can supply the needed fuel for the steam methane reformer 110.

In an embodiment, a flue gas can be emitted from the steam methane reformer 110, wherein the flue gas comprises combustion products generated by combustion of the fuel that is fed to the steam methane reformer 110, such as carbon dioxide and water vapor. The steam methane reformer fuel can be burned at a bottom of the steam methane reformer 110, and a flue gas stream 9 can be vented or emitted at the top of the steam methane reformer 110, wherein furnace tubes filled with catalyst are dispersed within the furnace vessel between fuel burners and the flue gas vent/outlet stream 9. As will be appreciated by one of skill in the art with the help of this disclosure, the fuel burning (e.g., burner flames) and the fuel combustion products do not contact directly the feed natural gas travelling through and reforming within the catalyst filled tubes (e.g., nickel-based catalyst filled tubes). That is, the steam methane reformer fuel burns inside the steam methane reformer 110 and outside the catalyst filled tubes where the reformation reactions occur, and the fuel combustion products travel through the steam methane reformer 110 and along an outer surface of the catalyst filled tubes towards the outlet for the flue gas, which is emitted in flue gas stream 9.

In an embodiment, the feed components of natural gas and steam can be introduced to the one or more catalyst filled tubes (e.g., nickel-based catalyst filled tubes), wherein the catalyst filled tubes are indirectly heated by burning a fuel, and as the natural gas and steam travel along the catalyst filled tubes, methane can be reformed to produce hydrogen and carbon monoxide, and the unshifted syngas comprising hydrogen and carbon monoxide can be collected as it exits the catalyst filled tubes.

In an embodiment, the steam methane reformer 110 can be characterized by a reforming temperature of from about 800° C. to about 900° C., alternatively from about 800° C. to about 850° C., or alternatively from about 850° C. to about 900° C. In an embodiment, the steam methane reformer 110 can be characterized by a reforming pressure of from about 1 bar to about 30 bars, alternatively from about 20 bars to about 30 bars, alternatively from about 1 bar to about 10 bars, alternatively from about 1.5 bars to about 8 bars, or alternatively from about 2 bars to about 5 bars.

While FIG. 1 shows that streams 1 and 11 are fed separately to the steam methane reformer 110, it is contemplated that the steam in stream 11 can be combined with the natural gas in stream 1 prior to being fed to the steam methane reformer 110, such that a water saturated natural gas is fed to the steam methane reformer 110. The contents of streams 1 and 11 can be combined in a saturator unit prior to feeding the water saturated natural gas to the steam methane reformer 110, or can be combined by joining the piping of streams 1 and 11 at a piping joint prior to feeding to the steam methane reformer 110 in a common conduit or pipe.

In aspects, the unshifted syngas can be contained in stream 2. The unshifted syngas can comprise hydrogen, carbon monoxide, and optionally: carbon dioxide, methane (e.g., unreacted methane, unreformed methane), sulfur-containing compounds in case of passivated reformer catalyst (e.g., hydrogen sulfide, carbon sulfide, carbonyl sulfide, carbon disulfide, organic sulfur compounds, etc.), chlorides, steam, or a combination thereof.

In some embodiments, the unshifted syngas can be characterized by a molar ratio of hydrogen to carbon monoxide of from about 1.7:1 to about 2.5:1, alternatively from about 1.8:1 to about 2.3:1, or alternatively from about 1.9:1 to about 2.1:1, for example if a reformer comprising a sulfur passivated nickel-based catalyst is used, such as a new reformer. In an embodiment, the unshifted syngas can have a molar ratio of hydrogen to carbon monoxide of about 2:1. In other embodiments, the unshifted syngas can be characterized by a molar ratio of hydrogen to carbon monoxide of from about 3:1 to about 4:1, for example if a reformer comprising a sulfur sensitive nickel-based catalyst is used, such as an existing reformer.

In some embodiments, the unshifted syngas can comprise carbon dioxide in an amount of less than about 20 mole % (mol %), alternatively less than about 10 mol %, or alternatively less than about 5 mol %, for example if a reformer comprising a sulfur passivated nickel-based catalyst is used, such as a new reformer. In other embodiments, the unshifted syngas can comprise carbon dioxide in an amount of less than about 50 mol %, for example if a reformer comprising a sulfur sensitive nickel-based catalyst is used, such as an existing reformer (e.g., conventional reformer).

In an embodiment, the unshifted syngas can comprise methane (e.g., unreacted methane, unreformed methane) in an amount of less than about 5 mol %, alternatively less than about 2.5 mol %, alternatively less than about 2 mol %, or alternatively less than about 1 mol %.

In other embodiments, the unshifted syngas can comprise sulfur-containing compounds in an amount of less than about 1 ppmv. As will be appreciated by one of skill in the art, and with the help of this disclosure, a portion of syngas contaminants (e.g., sulfur-containing compounds, chlorides, etc.) can be in a gas state in the syngas, and a portion of the contaminants can be dissolved in the water present in the syngas.

In some embodiments, the unshifted syngas can have a pressure of from about 5 pounds per square inch gauge (psig) to about 50 psig, for example if a reformer comprising a sulfur passivated nickel-based catalyst is used, such as a new reformer. In other embodiments, the unshifted syngas can have a pressure of from about 300 psig to about 500 psig, for example if a reformer comprising a sulfur sensitive nickel-based catalyst is used, such as an existing reformer.

The process can further include introducing the unshifted syngas (e.g., via stream 2) to a water gas shift unit 120 to produce a shifted syngas (e.g., in stream 3). In embodiments, the shifted syngas comprises hydrogen, carbon monoxide, and carbon dioxide. The molar ratio of hydrogen to carbon monoxide in the unshifted syngas can be increased (e.g., adjusted) by introducing the unshifted syngas to a water gas shift unit 120 comprising a sour shift catalyst to convert carbon monoxide and water into additional hydrogen and carbon dioxide according to the general reaction $CO+H_2O \leftrightarrow H_2+CO_2$, also known as the water-gas shift (WGS) reaction. The WGS reaction can be conducted in the presence of a variety of sour shift catalysts at a WGS reaction temperature of from about 204.4° C. to about 482.2° C., alternatively from about 232.2° C. to about 454.5° C., or alternatively from about 260° C. to about 426.7° C. The WGS reaction does not change the total number of moles (e.g., two moles of products are produced from two moles of reactants), and as such an effect of pressure on the WGS reaction is minimal. The equilibrium of the WGS reaction can be shifted towards hydrogen production in the presence of high moisture content. Generally, excess moisture can be present in the unshifted syngas that is recovered from the reformer, and such moisture is usually sufficient to drive the WGS reaction to achieve a desired molar ratio of hydrogen to carbon monoxide. In an embodiment, steam can be further introduced to the water gas shift unit 120 to increase the moisture content.

In some embodiments, the unshifted syngas can be heated to a temperature that is greater than a syngas moisture saturation temperature by from about 11.1° C. to about 41.7° C., alternatively from about 13.8° C. to about 33.3° C., or alternatively from about 16.6° C. to about 27.8° C., prior to introducing the unshifted syngas to the water gas shift unit 120. As will be appreciated by one of skill in the art with the help of this disclosure, if the temperature of the unshifted syngas is too low, the water could condense inside the water gas shift unit 120 and such water condensation could damage a sour shift catalyst. The syngas moisture saturation temperature can be from about 176.6° C. to about 260° C., depending on the unshifted syngas composition and process conditions for producing the unshifted syngas.

In an embodiment, the water gas shift unit 120 can comprise any suitable reactor, such as for example a fixed bed reactor, adiabatic reactor, radial reactor, and the like, or combinations thereof. In an embodiment, a water gas shift reactor can comprise a catalyst bed comprising a sour shift catalyst in sulfur is present in the feed syngas. In an embodiment, the water gas shift unit 120 can be a multi-stage unit, for example the water gas shift unit 120 can comprise multiple reactors and/or multiple fixed beds.

The WGS reaction can be catalyzed by both metals and metal oxides. Non-limiting examples of sour shift catalysts suitable for use in the present disclosure include cobalt, molybdenum, copper, iron, a cobalt-molybdenum catalyst, a chromium promoted iron-based catalyst, a copper promoted iron-based catalyst, a copper-zinc-aluminum catalyst, copper oxide (CuO), iron oxide ($Fe_2O_3$), oxides thereof, and the like, or combinations thereof. Sweet shift catalysts are generally iron based.

In an embodiment, a molar ratio of hydrogen to carbon monoxide in the shifted syngas can be greater than a molar ratio of hydrogen to carbon monoxide in the unshifted syngas. In an embodiment, the shifted syngas can be characterized by a molar ratio of hydrogen to carbon monoxide of equal to or greater than about 100:1, alternatively from about 5:1 to about 100:1, alternatively from about 10:1 to about 75:1, or alternatively from about 15:1 to about 40:1. As will be appreciated by one of skill in the art, and with the help of this disclosure, the molar ratio of hydrogen to carbon monoxide depends on shifting (e.g., CO conversion via the WGS reaction) conditions (e.g., type of WGS unit, type of catalyst used in the WGS unit, etc.). Further, as will be appreciated by one of skill in the art, and with the help of this disclosure, full shifting (e.g., almost all CO undergoes the WGS reaction) can lead to hydrogen to carbon monoxide molar ratios of over 10:1 due to very small CO numbers; single stage, mild shifting can lead to hydrogen to carbon monoxide molar ratios of from about 5:1 to about 10:1; a more moderate level of full shift can lead to hydrogen to carbon monoxide molar ratios of about 7:1; and the hydrogen to carbon monoxide molar ratio decreases with catalyst age.

In an embodiment, an amount of carbon dioxide in the shifted syngas can be greater than an amount of carbon dioxide in the unshifted syngas. As will be appreciated by one of skill in the art, and with the help of this disclosure, carbon dioxide is produced in equimolar amounts with hydrogen via the WGS reaction.

In aspects, the shifted syngas in stream 3 also contains unreacted steam.

The process can further include cooling the shifted syngas in a heat exchanger 130 to remove an aqueous condensate from the shifted syngas. The heat exchanger 130 is configured as a cross-exchanger, where one side of the heat exchanger 130 is the shifted syngas side 131, and the other side of the heat exchanger 130 contains the coolant that cools the shifted syngas and is the coolant side 132. The shifted syngas side 131 of the heat exchanger 130 is configured to receive the shifted syngas on the shifted syngas, cool the shifted syngas such that water condenses to form an aqueous condensate on the shifted syngas side 131. The cooled shifted syngas exits the shifted syngas side 131 of the heat exchanger 130 in stream 4.

FIG. 1 shows a coolant stream 12 having an end 13 coupled to the shifted syngas side 131 of the heat exchanger 130 and an opposite end 14 coupled to the coolant side 132 of the heat exchanger 130. The coolant stream 12 is configured to remove the aqueous condensate from the shifted syngas side 131 of the heat exchanger 130 and to introduce the aqueous condensate to the coolant side 132 of the heat exchanger 130. A pump 15 can be included in the coolant stream 12 to facilitate flow of the aqueous condensate from the shifted syngas side 131 of the heat exchanger 130 to the coolant side 132 of the heat exchanger 130. The coolant side 132 of the heat exchanger 130 is configured receive the aqueous condensate, and to heat the aqueous condensate to produce a heat exchanger steam. The heat exchanger steam can exit the coolant side 132 of the heat exchanger 130 via stream 10, and the heat exchanger steam can be fed to the steam methane reformer 110.

With this configuration of the cooling unit 130, the process can further include removing the aqueous condensate from the shifted syngas side 131 of the heat exchanger 130, introducing the aqueous condensate to the coolant side 132 of the heat exchanger 130, and producing the heat exchanger steam in the heat exchanger 130.

In some aspects, the heat exchanger steam in stream 10 can be the feed steam that is introduced to the steam methane reformer 110, and there is no need for steam in stream 11 during steady state operation of the system 100. In such aspects, steam in stream 11 may be supplied to the steam methane reformer 110 on startup of the system 100.

The process can further include removing $CO_2$ from the shifted syngas to produce a $CO_2$ product and a $CO_2$ depleted syngas. The process generally utilizes an absorption unit 140 as illustrated in FIG. 1, to receive the cooled shifted syngas in stream 4, to remove $CO_2$ from the shifted syngas to produce the $CO_2$ product in stream 5 and the $CO_2$ depleted syngas in stream 6.

Removing $CO_2$ from the shifted syngas (e.g., the cooled shifted syngas) can include absorbing $CO_2$ with a lean physical solvent to produce the $CO_2$ depleted syngas and a $CO_2$ enriched physical solvent, and flashing the $CO_2$ enriched physical solvent to produce the $CO_2$ product and the lean physical solvent. Flashing does not require a stripper, so there is no steam needed to remove $CO_2$ when using a physical solvent. Moreover, using a physical solvent allows for the equipment in the absorption unit to be made of carbon steel (not made of any stainless steel).

Alternatively, removing $CO_2$ from the shifted syngas (e.g., the cooled shifted syngas) can include absorbing $CO_2$ with a lean amine solvent to produce the $CO_2$ depleted syngas and a $CO_2$ enriched amine solvent, and stripping the $CO_2$ enriched amine solvent to produce the $CO_2$ product and the lean amine solvent.

In an embodiment, the absorption unit 140 includes an absorber and regenerator, where at least a portion of the carbon dioxide can be removed (e.g., recovered, separated, etc.) from at least a portion of the cooled shifted syngas by a physical solvent or a chemical solvent in the absorber.

Examples of physical solvents useful in the absorption unit 140 include methanol, propylene carbonate, N-methylpyrrolidone, a glycol ether, ethers of polyglycols (e.g., dimethoxytetraethylene glycol or N-substituted morpholine), or a combination thereof. In an embodiment, the absorption solvent can comprise a Fluor Solvent system comprising or consisting of a propylene carbonate solvent, available from Fluor.

Examples of chemical solvent useful in the absorption unit 140 include primary amines, secondary amines, tertiary amines, sterically hindered amines, methylethylamine (MEA), methyl diethanolamine (MDEA), diglycolamine (DGA), 2-amino-2-methyl-1-propanol (AMP), or a combination thereof.

The chemical solvent or physical solvent absorbs the carbon dioxide while the remaining components of the cooled shifted syngas pass through the absorber to form the $CO_2$ depleted syngas in stream 6. The carbon dioxide in the $CO_2$ enriched solvent leaves the absorber and is fed to a regenerator, where the carbon dioxide is separated from the solvent (the solvent is regenerated) to produce a lean solvent (e.g., a lean physical solvent or a lean chemical solvent) and a $CO_2$ product. The lean solvent can be recycled to the absorber, and the $CO_2$ product is recovered in stream 5 of FIG. 1. In an embodiment, the absorber can comprise any suitable absorber column, wherein a gas phase (e.g., the cooled shifted syngas) interacts with a liquid phase (e.g., absorption solvent) via co-current flow, counter-current flow, or cross-flow. Generally, absorption columns can be vertical and cylindrical columns or towers. In an embodiment, the absorber can comprise a countercurrent absorber column, wherein the shifted syngas can be introduced to the column countercurrent (e.g., opposing flow directions) with respect to the flow of absorption solvent. In an embodiment, the absorption solvent can be introduced as a downflow at the top of the absorber, and the shifted syngas can be introduced (e.g., bubbled) at the bottom of the absorber. In such embodiment, the $CO_2$ depleted syngas can be recovered at the top of the absorber, and the $CO_2$ enriched solvent can be recovered at the bottom of the absorber. The absorber can have one or more trays and/or packing as a contacting device. However, any other suitable contacting devices can be employed, such as for example static or dynamic mixers, spargers, impellers, etc. In some embodiments, the absorption unit 140 can comprise a packed bed column, a tray column, a spray column, a falling film column, a bubble column, a sparged tank column, and the like, or combinations thereof. In an embodiment, the absorber can operate at a pressure of from about 375 psig to about 575 psig, alternatively from about 400 psig to about 550 psig, or alternatively from about 450 psig to about 500 psig.

In aspects where the absorption solvent is a physical solvent, the regenerator can be embodied as a flash tank or flash column configured to remove the carbon dioxide from the $CO_2$ rich physical solvent by pressure reduction, i.e., flashing (e.g., via pressure reduction) the carbon dioxide out of the physical solvent. In aspects, the flash tank can comprise any suitable vessel, wherein a gas phase (e.g., the carbon dioxide) is flashed by differential pressure from the liquid phase (e.g., the $CO_2$ enriched solvent). Generally, the flash tank can be any vessel configured to subject the $CO_2$ enriched solvent to a drop in pressure such that the carbon dioxide is liberated from the liquid solvent to form the lean physical solvent. A pressure in the flash tank is generally lower than a pressure in the absorber to enable the carbon dioxide to flash from $CO_2$ enriched solvent to produce the lean physical solvent and the $CO_2$ product in stream 5. In an embodiment, the flash tank can operate at a pressure in a range of from a vacuum pressure to about 200 psig (1.38 MPag). In some embodiments, the flash tank is one or more vessels (e.g., more than one flash tank) connected in series such that the reduction in pressure is accomplished in stages: a first stage to reduce the pressure of the In aspects where the absorption solvent is a chemical solvent, the regenerator can be embodied as a stripper configured to use a stripping gas to remove the carbon dioxide from the chemical solvent. The stripper can include a reboiler that provides heat to the stripper for removing carbon dioxide from the chemical solvent to produce the lean chemical solvent. In aspects, the stripper can comprise any suitable stripping column, wherein a gas phase (e.g., the carbon dioxide) is removed from the liquid phase (e.g., the $CO_2$ enriched solvent). Generally, the stripper can be similar in configuration to the absorber, while operating at different parameters (e.g., pressure, temperature, etc.). A pressure in the stripper can be lower than a pressure in the absorber and a temperature in the stripper can be higher than a temperature in the absorber, to enable the $CO_2$ enriched solvent to release carbon dioxide. Generally, the stripper can be one or more vertical and cylindrical columns or towers. In an embodiment, the $CO_2$ enriched solvent can be introduced as a downflow at the top of the stripper, and a portion of the lean solvent can be re-introduced at the bottom (e.g., bubbled) of the stripper as vapor (e.g., using a reboiler). In such embodiment, carbon dioxide can be recovered at the top of the stripper, and the lean solvent can be recovered at the bottom of the stripper. Generally, a reboiler for the stripper can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. In some embodiments, the stripper can comprise a packed bed column, a tray column, a spray column, a falling film column, a bubble column, a sparged tank column, and the like, or combinations thereof. In an embodiment, the stripper can operate at a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In aspects, the $CO_2$ depleted syngas in stream 6 can comprise substantially all of the hydrogen present in the cooled shifted syngas in stream 4. In an embodiment, the $CO_2$ depleted syngas can contain equal to or greater than about 50 mol %, alternatively equal to or greater than about 60 mol %, alternatively equal to or greater than about 60 mol %, alternatively equal to or greater than about 80 mol %, alternatively equal to or greater than about 90 mol %, alternatively equal to or greater than about 95 mol %, or alternatively equal to or greater than about 99 mol % of the hydrogen of the cooled shifted syngas.

In aspects, the $CO_2$ enriched solvent can comprise carbon dioxide in an amount of equal to or greater than about 30 mol %, alternatively equal to or greater than about 40 mol %, or alternatively equal to or greater than about 50 mol % of the carbon dioxide of the cooled shifted syngas.

In an embodiment, the process can include sequestering the carbon dioxide product in $CO_2$ product stream 5. In an embodiment, the carbon dioxide product in stream 5 can comprise substantially all of the carbon dioxide of the cooled shifted syngas in stream 4. In some embodiments, the carbon dioxide product can comprise equal to or greater than about 99 mol %, alternatively equal to or greater than about 99.5 mol %, alternatively equal to or greater than about 99.9 mol %, or alternatively equal to or greater than about 99.99 mol % of the carbon dioxide of the cooled shifted syngas in stream 4.

Alternatively, the process can include sending the carbon dioxide product in $CO_2$ product stream 5 to storage or a pipeline for transport, for example, for use in enhanced oil recovery.

The process can further include introducing the $CO_2$ depleted syngas (e.g., via stream 6) to a pressure swing absorption (PSA) unit 150 to produce a hydrogen product (e.g., in stream 7) and an off-gas (e.g., in stream 8). The off-gas in stream 8 can include carbon monoxide, carbon dioxide, methane, and hydrogen. The methane in the off-gas can be unreacted methane that was fed to, but not converted to syngas in, the steam methane reformer 110. The carbon dioxide in the off-gas stream 8 can be residual carbon dioxide that was not removed in the absorption unit 140. The hydrogen in the off-gas stream 8 is hydrogen that is produced in the process, and in the present disclosure and as described in more detail below, the off-gas stream 8 is coupled to the steam methane reformer 110, and the PSA 150 is operated such that a larger amount of hydrogen is present in the off-gas stream 8 such that the off-gas stream 8 can function as the only fuel source for the steam methane reformer 110.

In an embodiment, the PSA unit 150 comprises an adsorbent material. Non-limiting examples of adsorbent materials suitable for use in the present disclosure include molecular sieves, zeolites, such as 5A zeolite and 13X zeolite, and the like, or combinations thereof.

Pressure swing absorption (PSA) is generally based on physical binding of gas molecules (e.g., hydrogen, methane, carbon dioxide, etc.) to an adsorbent material (e.g., a solid). Binding strength between the gas molecules and the adsorbent material depends on the gas components, type of adsorbent material, partial pressures of the gas components and operating temperature. Purifying a gas by PSA separation is based on differences in binding strength of the gas components to the adsorbent material. Highly volatile components with low polarity, such as hydrogen, are practically non-adsorbable, as opposed to molecules like methane and carbon dioxide. PSA generally has an adsorption step, and a desorption step. During the adsorption step, high purity hydrogen can be recovered from a PSA unit 150, as hydrogen will not be adsorbed. Methane and carbon dioxide will be adsorbed by the adsorbent material, and can be recovered during the desorption step.

PSA works at basically constant temperature and uses the effect of alternating pressure and partial pressure to perform the adsorption step and the desorption step. Since heating or cooling is not required, short cycles within the range of minutes can be achieved. A cycle can be defined as the time between the start of two consecutive adsorption steps. The adsorption is carried out at high pressure, until an equilibrium loading is reached, wherein no further adsorption capacity is available and the adsorbent material must be regenerated. The desorption step can be done by lowering the pressure to slightly above atmospheric pressure resulting in a respective decrease in equilibrium loading. As a result, the gases (e.g., methane, carbon dioxide) that were adsorbed by the adsorbent material are desorbed and the adsorbent material is regenerated. Once the desorption step is completed, the pressure is increased back to adsorption pressure level and another adsorption step begins. Generally, PSA also involves a purge step between the desorption step and the adsorption step, to ensure that the adsorber material is ready to undergo the next adsorption step.

In an embodiment, the $CO_2$ depleted syngas can be introduced to the PSA unit at the bottom, and can travel upwards through the adsorbent material, wherein hydrogen can be recovered at a top of the PSA unit during the adsorption step. In such embodiment, the PSA off-gas comprising methane and carbon dioxide can be recovered at the bottom of the PSA unit during the desorption step.

In an embodiment, the PSA unit 150 comprises from about 2 to about 10 PSA units, alternatively from about 3 to about 8 PSA units, alternatively from about 3 to about 6 PSA units operating in parallel, to provide a continuous supply of hydrogen, and to provide for a continuous uptake of $CO_2$ depleted syngas. Once an adsorption step is completed in a PSA unit 150, and such unit starts a desorption step, another PSA unit can take over the adsorption step to ensure a continuous process. As will be appreciated by one of skill in the art, and with the help of this disclosure, more than one PSA unit can undergo the adsorption step at the same time, and similarly, more than one PSA unit can undergo the desorption step at the same time. As long as there is always a PSA unit undergoing an adsorption step and/or ready to undergo an adsorption step, hydrogen production can be continuous.

In an embodiment, the hydrogen in hydrogen product stream 7 can be characterized as a blue hydrogen because while methane is in the feed to the steam methane reformer 110, the carbon dioxide produced in the process and system 100 is captured for subsequent use or storage or sequestration. In aspects, the purity of hydrogen in stream 7 can be equal to or greater than about 99 mol %, alternatively equal to or greater than about 99.9 mol %, or alternatively equal to or greater than about 99.99 mol % based on a number of moles of components in stream 7.

In an embodiment, the hydrogen in hydrogen product stream 7 can be characterized by a pressure of from about 375 psig to about 575 psig, alternatively from about 400 psig to about 550 psig, or alternatively from about 450 psig to about 500 psig. As will be appreciated by one of skill in the art, and with the help of this disclosure, the hydrogen can have about the same pressure as the pressure used for the adsorption step.

In an embodiment, the PSA off-gas in stream 8 can be characterized by a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, the PSA off-gas can further comprise hydrogen (e.g., residual hydrogen). Residual hydrogen in the PSA off-gas can usually come from hydrogen that remains in the PSA unit once the adsorption step is finished, and such residual hydrogen is recovered in the PSA off-gas during the desorption step.

In accordance with this disclosure, the PSA off-gas in stream 8 can be used as fuel for heating the steam methane reformer 110. In an aspect, the PSA off-gas is the only fuel used for heating the steam methane reformer 110. The methane and elevated amount of hydrogen (compared with traditional off-gas streams) from the PSA off-gas in stream 8 can combust in the steam methane reformer 110 to provide heat for the endothermic reforming reactions taking place in the steam methane reformer 110 reformer, and the flue gas emitted from the steam methane reformer 110 in stream 9 can comprise water vapor and carbon dioxide from such combustion, as well as excess oxygen and nitrogen.

In aspects, the off-gas in stream 8 comprises at least 25, 30, 35, 40, 45, or 50 mol % hydrogen based on a total moles of components in the off-gas. In additional or alternative aspects, the off-gas stream 8 is the only source of fuel fed to the steam methane reformer 110, and the off-gas in stream 8 (the fuel for the steam methane reformer 110) comprises at least 25, 30, 35, 40, 45, or 50 mol % hydrogen based on a total moles of fuel introduced to the steam methane reformer 110. In additional or alternative aspects, the off-gas in stream 8 contains less than 60, 55, 50, 45, 40, 35, 30, 25, 20, 15, 10, 5, 4, or 3 mol % carbon dioxide based on a total moles of components in the off-gas. In additional or alternative aspects, the off-gas is the only source of fuel fed to the steam methane reformer 110, and the off-gas in stream 8 (the fuel for the steam methane reformer 110) comprises less than 60, 55, 50, 45, 40, 35, 30, 25, 20, 15, 10, 5, 4, or 3 mol % carbon dioxide based on a total moles of fuel introduced to the steam methane reformer 110.

FIG. 2 illustrates a flue gas treatment process that can be implements using the flue gas treatment system 200. The flue gas treatment process and system 200 can be used in combination with the process and system 100 of FIG. 1. In FIG. 2, the flue gas treatment system 200 can include a cooling unit 210, a compression unit 220, an absorption unit 230, and a pressure swing absorption (PSA) unit 240. As will be appreciated by one of skill in the art, and with the help of this disclosure, components of the hydrogen production system can be in fluid communication with each other through any suitable conduits (e.g., pipes, streams, etc.).

Generally, the steam methane reformer 110 of the process and system 100 produces a flue gas that is in flue gas stream 9. The process that is implemented by the system 200 in FIG. 2 includes receiving the flue gas in flue gas stream 9 in a heat exchanger 210. The flue gas can generally include oxygen, nitrogen, water vapor, and carbon dioxide.

The process also includes cooling the flue gas in the heat exchanger 210 to produce a cooled flue gas in stream 21. The heat exchanger 210 can be any heat exchanger configured to cool the flue gas in preparation for removing carbon dioxide as disclosed herein. In some aspects, cooling the flue gas can condense water to produce an aqueous condensate in stream 20. In such aspects, the cooled flue gas in stream 21 is a dried flue gas. In some further aspects, the aqueous condensate in stream 20 can be fed to another area of the plant that contains the processes and systems 100 and 200, or stream 20 can be heated and fed as steam to the steam methane reformer 110, additionally reducing the need for fresh steam to the steam methane reformer 110.

The process can further include splitting the cooled (dried) flue gas in stream 21 into a first portion in stream 22 and a second portion in stream 23. The splitting can be accomplished with a splitter 215 that is configured to connect to the stream 21 and streams 22 and 23. The flow of the first portion of the cooled (dried) flue gas in stream 22 can be from about 1 vol % to about 50 vol % of the flow of cooled (dried) flue gas in the cooled flue gas stream 21, with the balance flowing in the second portion in stream 23. The second portion can include greater than 90 vol % of the nitrogen in the flue gas on a dry basis. In aspects, the carbon capture of the process and system 200 in combination with carbon capture of process and system 100 can range from about 60% to about 95%, depending on the flow split in streams 22 and 23 (0% flow in stream 22=about 60% and 100% flow in stream 22=about 95%). For example, a flow of zero in stream 22 would amount to a carbon capture equal to that of the process and system 100 (about 60%) since carbon dioxide in the flue gas would flow from the process and system 200 in stream 23. On the other hand, a flow split of 100% in stream 22 (0% in stream 3) would increase the carbon capture to about 95%. The relationship of split to carbon capture is linear between the endpoint of 0%:about 60% to 100%:about 95%.

The process can further include compressing the first portion in a compressor 220 to produce a compressed first portion in stream 24. The compressor 220 can be embodied as any compressor suitable for cooling gases that include carbon dioxide.

The process can additionally include removing $CO_2$ from the compressed first portion in stream 24. $CO_2$ removal can be accomplished by amine-based absorption in an absorption unit 230 to produce a residual $CO_2$ in stream 25 and a $CO_2$ depleted flue gas in stream 26. Amine-based absorption involves using an absorber followed by a stripper, and a chemical solvent to absorb carbon dioxide. Examples of chemical solvent useful in the absorption unit 230 include primary amines, secondary amines, tertiary amines, sterically hindered amines, methylethylamine (MEA), methyl diethanolamine (MDEA), diglycolamine (DGA), 2-amino-2-methyl-1-propanol (AMP), or a combination thereof. The chemical solvent absorbs the carbon dioxide while the remaining components of the compressed flue gas pass through the absorber to form the $CO_2$ depleted flue gas in stream 26. The carbon dioxide in the $CO_2$ enriched solvent leaves the absorber and is fed to a regenerator, where the carbon dioxide is separated from the solvent (the solvent is regenerated) to produce a lean solvent (e.g., a lean chemical solvent) and a $CO_2$ product in stream 25. The lean solvent can be recycled to the absorber, and the $CO_2$ product is recovered in stream 25 of FIG. 2. In an embodiment, the absorber can comprise any suitable absorber column, wherein a gas phase (e.g., the compressed flue gas) interacts with a liquid phase (e.g., absorption solvent) via co-current flow, counter-current flow, or cross-flow. Generally, absorption columns can be vertical and cylindrical columns or towers. In an embodiment, the absorber can comprise a countercurrent absorber column, wherein the compressed flue gas can be introduced to the column countercurrent (e.g., opposing flow directions) with respect to the flow of absorption solvent. In an embodiment, the absorption solvent can be introduced as a downflow at the top of the absorber, and the compressed flue gas can be introduced (e.g., bubbled) at the bottom of the absorber. In such embodiment, the $CO_2$ depleted flue gas can be recovered at the top of the absorber, and the $CO_2$ enriched solvent can be recovered at the bottom of the absorber. The absorber can have one or more trays and/or packing as a contacting device. However, any other suitable contacting devices can be employed, such as for example static or dynamic mixers, spargers, impellers, etc. In some embodiments, the absorption unit 230 can comprise a packed bed column, a tray column, a spray column, a falling film column, a bubble column, a sparged tank column, and the like, or combinations thereof. In an embodiment, the absorber can operate at a pressure of from about 375 psig to about 575 psig, alternatively from about 400 psig to about 550 psig, or alternatively from about 450 psig to about 500 psig.

The stripper of the absorption unit 230 can be configured to use a stripping gas to remove the carbon dioxide from the chemical solvent. The stripper can include a reboiler that provides heat to the stripper for removing carbon dioxide from the chemical solvent to produce the lean chemical solvent. In aspects, the stripper can comprise any suitable stripping column, wherein a gas phase (e.g., the carbon dioxide) is removed from the liquid phase (e.g., the $CO_2$ enriched solvent). Generally, the stripper can be similar in configuration to the absorber, while operating at different parameters (e.g., pressure, temperature, etc.). A pressure in the stripper can be lower than a pressure in the absorber and a temperature in the stripper can be higher than a temperature in the absorber, to enable the $CO_2$ enriched solvent to release carbon dioxide. Generally, the stripper can be one or more vertical and cylindrical columns or towers. In an embodiment, the $CO_2$ enriched solvent can be introduced as a downflow at the top of the stripper, and a portion of the lean solvent can be re-introduced at the bottom (e.g., bubbled) of the stripper as vapor (e.g., using a reboiler). In such embodiment, carbon dioxide can be recovered at the top of the stripper, and the lean solvent can be recovered at the bottom of the stripper. Generally, a reboiler for the stripper can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. In some embodiments, the stripper can comprise a packed bed column, a tray column, a spray column, a falling film column, a bubble column, a sparged tank column, and the like, or combinations thereof. In an embodiment, the stripper can operate at a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, the process can include sequestering the carbon dioxide product in $CO_2$ product stream 25. In an embodiment, the carbon dioxide product in stream 25 can comprise substantially all of the carbon dioxide of the first portion of the cooled flue gas in stream 22. In some embodiments, the carbon dioxide product in stream 25 can comprise equal to or greater than about 99 mol %, alternatively equal to or greater than about 99.5 mol %, alternatively equal to or greater than about 99.9 mol %, or alternatively equal to or greater than about 99.99 mol % of the carbon dioxide of the first portion of the cooled flue gas in stream 22.

Alternatively, the process can include sending the carbon dioxide product in $CO_2$ product stream 25 to storage or a pipeline for transport, for example, for use in enhanced oil recovery.

Generally, stream 26 contains oxygen and nitrogen and may be vented to the atmosphere because most of the carbon dioxide in stream 22 is captured in stream 25 in the process and system 200 of FIG. 2.

In optional aspects, the process can additionally include removing $O_2$ from the $CO_2$ depleted flue gas in stream 26 by pressure swing absorption to produce a $N_2$ product. To accomplish this step, a pressure swing absorption (PSA) unit 240 can be configured to receive $CO_2$ depleted flue gas in stream 26. To remove oxygen, the process can include introducing the $CO_2$ depleted flue gas (e.g., via stream 26) to a pressure swing absorption (PSA) unit 240 to produce an oxygen product (e.g., in stream 27) and a nitrogen product (e.g., in stream 28).

In an embodiment, the PSA unit 240 comprises an adsorbent material. Non-limiting examples of adsorbent materials suitable for use in the present disclosure include molecular sieves, zeolites, such as 5A zeolite and 13X zeolite, and the like, or combinations thereof.

Pressure swing absorption (PSA) is generally based on physical binding of gas molecules (e.g., oxygen) to an adsorbent material (e.g., a solid). Binding strength between the gas molecules and the adsorbent material depends on the gas components, type of adsorbent material, partial pressures of the gas components and operating temperature. Purifying a gas by PSA separation is based on differences in binding strength of the gas components to the adsorbent material. Highly volatile components with low polarity, such as nitrogen, are practically non-adsorbable, as opposed to molecules like oxygen. PSA generally has an adsorption step, and a desorption step. During the adsorption step, high purity nitrogen can be recovered from a PSA unit 240, as oxygen will not be adsorbed. Oxygen will be adsorbed by the adsorbent material, and can be recovered during the desorption step.

PSA works at basically constant temperature and uses the effect of alternating pressure and partial pressure to perform the adsorption step and the desorption step. Since heating or cooling is not required, short cycles within the range of minutes can be achieved. A cycle can be defined as the time between the start of two consecutive adsorption steps. The adsorption is carried out at high pressure, until an equilibrium loading is reached, wherein no further adsorption capacity is available and the adsorbent material must be regenerated. The desorption step can be done by lowering the pressure to slightly above atmospheric pressure resulting in a respective decrease in equilibrium loading. As a result, the gases (e.g., oxygen) that were adsorbed by the adsorbent material are desorbed and the adsorbent material is regenerated. Once the desorption step is completed, the pressure is increased back to adsorption pressure level and another adsorption step begins. Generally, PSA also involves a purge step between the desorption step and the adsorption step, to ensure that the adsorber material is ready to undergo the next adsorption step.

In an embodiment, the $CO_2$ depleted flue gas in stream 26 can be introduced to the PSA unit at the bottom, and can travel upwards through the adsorbent material, wherein nitrogen can be recovered at a top of the PSA unit during the adsorption step. In such embodiment, the PSA off-gas comprising oxygen can be recovered at the bottom of the PSA unit during the desorption step.

In an embodiment, the PSA unit 240 comprises from about 2 to about 10 PSA units, alternatively from about 3 to about 8 PSA units, alternatively from about 3 to about 6 PSA units operating in parallel, to provide a continuous supply of nitrogen, and to provide for a continuous uptake of $CO_2$ depleted flue gas. Once an adsorption step is completed in a PSA unit 240, and such unit starts a desorption step, another PSA unit can take over the adsorption step to ensure a continuous process. As will be appreciated by one of skill in the art, and with the help of this disclosure, more than one PSA unit can undergo the adsorption step at the same time, and similarly, more than one PSA unit can undergo the desorption step at the same time. As long as there is always a PSA unit undergoing an adsorption step and/or ready to undergo an adsorption step, hydrogen production can be continuous.

The systems in FIG. 1 and FIG. 2 can be described in more detail

The hydrogen production system 100 can include the steam methane reformer 110 that is configured to contact methane and steam with a catalyst to form an unshifted syngas, the water gas shift unit 120 coupled to the steam methane reformer 110 and configured to receive the unshifted syngas from the steam methane reformer 110 and to produce a shifted syngas, an absorption unit 140 coupled to the water gas shift unit 120 (e.g., via the heat exchanger 130) and configured to receive the shifted syngas, remove carbon dioxide from the shifted syngas, and produce a $CO_2$ depleted syngas and a $CO_2$ product, and a pressure swing absorption unit 150 coupled to the absorption unit 140, wherein the pressure swing absorption unit 150 is configured to receive the $CO_2$ depleted syngas from the absorption unit 140 and to produce a hydrogen product and an off-gas. The system 100 can additionally include an off-gas stream 8 coupled to the pressure swing absorption unit 150 and to the steam methane reformer 110, wherein the off-gas stream 8 is configured to receive the off-gas from the pressure swing absorption unit 150 and to introduce the off-gas to the steam methane reformer 110 as fuel, wherein the off-gas in the off-gas stream 8 comprises carbon monoxide, carbon dioxide, unreacted methane, and at least 25 mol % hydrogen based on a total moles of components in the off-gas stream 8.

The system 100 can also include heat exchanger 130 that is coupled to the water gas shift unit 120 and to the steam methane reformer 110. The heat exchanger 130 can be configured to receive the shifted syngas from the water gas shift unit 120, to cool the shifted syngas, to remove an aqueous condensate from the shifted syngas, and to provide the shifted syngas without the aqueous condensate for introduction to the absorption unit 140.

The system 100 can also include a coolant stream 12 having an end 13 coupled to a shifted syngas side 131 of the heat exchanger 130 and an opposite end 14 coupled to a coolant side 132 of the heat exchanger 130. The coolant stream 12 can be configured to remove the aqueous condensate from the shifted syngas side 131 of the heat exchanger 130 and to introduce the aqueous condensate to the coolant side 132 of the heat exchanger 130. The heat exchanger 130 can be configured to heat the aqueous condensate to produce a heat exchanger steam, wherein the heat exchanger steam is fed to the steam methane reformer 110 via stream 10 that is connected to both the heat exchanger 130 and the steam methane reformer 110. The steam generated by the heat exchanger 130 can be characterized as a dirty steam that includes dissolved carbon dioxide and ammonia, and other impurities formed in the process and system. However, the steam (e.g., dirty steam) is suitable for feeding to the steam methane reformer 110 and can replace fresh plant steam; thus, reducing the need for cost and supply of fresh steam to the process and system 100. Moreover, the steam in stream 10 does not need to be treated and can flow without treatment from the heat exchanger 130 to the steam methane reformer 110.

In the system 100, the absorption unit 140 can include an absorber having a lean physical solvent configured to absorb carbon dioxide from the shifted syngas to produce a $CO_2$ enriched solvent and the $CO_2$ depleted syngas in stream 6. The absorption unit 140 can also include a flash tank coupled to the absorber, wherein the flash tank is configured to receive the $CO_2$ enriched solvent from the absorber and to flash carbon dioxide from the $CO_2$ enriched solvent to produce the lean physical solvent and the $CO_2$ product in stream 5. Alternatively, the absorption unit 140 in the system 100 can include an absorber having a lean chemical solvent configured to absorb carbon dioxide from the shifted syngas to produce a $CO_2$ enriched solvent and the $CO_2$ depleted syngas in stream 6, and a stripper coupled to the absorber, wherein the stripper is configured to receive the $CO_2$ enriched solvent from the absorber and to strip carbon dioxide from the $CO_2$ enriched solvent to produce the lean chemical solvent and the $CO_2$ product in stream 5.

In the system 100, the amount of $CO_2$ in the $CO_2$ product (stream 5) comprises greater than 60 mol % of a sum amount that is the amount of $CO_2$ that is introduced into plus the amount of $CO_2$ that is generated in the system.

The system 100 can also include system 200. The system 200 can include a heat exchanger 210 coupled to the steam methane reformer 110 and configured to receive a flue gas from the steam methane reformer 110 and to cool the flue gas to produce a cooled flue gas. The system 200 can further include a splitter 215 coupled to the heat exchanger and configured to split the cooled flue gas into a first portion in stream 22 and a second portion in stream 23. The split ratio of the splitter 215 based on mol flow rate for the first portion in stream 22 to the second portion in stream 23 can range from about 1:10 to 1:1; alternatively, 1:10 to 1:5. The system 200 can also include a compressor 220 coupled to the splitter 215 and configured to compress the first portion received from stream 22 to produce a compressed first portion in stream 24. The system 200 can also include an absorption unit 230 coupled to the compressor 220 and configured to receive the compressed first portion from stream 24, contact the first portion with a lean amine-based solvent, and to produce a residual $CO_2$ in stream 25 and a $CO_2$ depleted flue gas in stream 6. The system 200 can also include a pressure swing absorption unit 240 coupled to the absorption unit 230 and configured to receive the $CO_2$ depleted flue gas in stream 6 from the absorption unit 230, remove $O_2$ from the $CO_2$ depleted flue gas by pressure swing absorption, and to produce a $N_2$ product in stream 28. $O_2$ product can be recovered in $O_2$ product stream 27. The purity of $N_2$ product in the $N_2$ product stream 28 can be about 95 mol % based on a total moles of components in stream 28, which makes the $N_2$ product stream 28 suitable for use in the plant where the processes and systems are located. The purity of $O_2$ product in $O_2$ product stream 27 can be in a range of 40 mol % to 70 mol %, for example about 50 mol %, based on total moles of components in the stream 27.

In some aspects, the $O_2$ product stream 27 can be connected to the steam methane reformer 110, and can be configured to feed oxygen to the steam methane reformer 110.

The process and system 100 alone or in combination with the process and system 200 disclosed herein have improved carbon dioxide recovery. Carbon dioxide recovery is defined as the amount of carbon dioxide that is removed from the process and system via a stream that is dedicated for carbon dioxide relative to the amount of carbon dioxide that the introduced to and generated in the same process and system. A conventional hydrogen production system does not recover carbon dioxide; thus, the carbon dioxide ends in a flue gas or vent gas and there are no streams that are dedicated for carbon dioxide recovery. A stream that is dedicated to carbon dioxide recovery (e.g., for carbon dioxide sequestration or for transport or storage to pipeline) can have a concentration of carbon dioxide that is 95, 96, 97, 98, 99, or higher mol % carbon dioxide based on a total moles of components in the stream.

For process and system 100, the stream that is dedicated for carbon dioxide recovery is stream 5. The carbon dioxide recovery is such that the amount of $CO_2$ in the $CO_2$ product of stream 5 comprises greater than about 60 mol % of a sum amount equaling i) the amount of $CO_2$ that is introduced into the process and system 100 via any of streams 1 and 11, plus ii) the amount of $CO_2$ that is generated in the process and system 100.

For process and system 100 in combination with process and system 200, the streams that are dedicated for carbon dioxide recovery are streams 5 and 25. Carbon dioxide recovery is such that a first sum amount that is the amount of $CO_2$ in the $CO_2$ product plus the amount of $CO_2$ in the residual $CO_2$ is in a range of from about 60 mol % to about 95 mol % of a second sum amount that is the amount of $CO_2$ that is introduced into the process and system 100 and 200 plus the amount of $CO_2$ that is generated in the process and system 100 and 200. The exact amount of carbon dioxide recovery can depend on the split ratio of the cooled flue gas stream 21 in the splitter 28. Carbon dioxide recovery increases as the proportion of cooled flue gas in the first portion in stream 22 increases relative to the proportion of cooled flue gas in the second portion in stream 23.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

EXAMPLES

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggested to one of ordinary skill in the art without departing from the spirit of the present invention or the scope of the appended claims.

Examples 1 and 2 are simulations performed using simulation software.

Example 1

Example 1 uses the process and system 100 illustrated in FIG. 1.

The steam methane reformer 110 had a radian absorbed duty of 112,641 kW. The pressure swing absorption unit 150 had a recovery of 84%. The steam/CO ratio in stream 2 was 2.8.

Selected conditions for the streams in FIG. 1 are shown in Table 1 below:

TABLE 1

|  | Stream No. | | | | |
| --- | --- | --- | --- | --- | --- |
|  | 1 | 2 | 3 | 4 | 5 |
| Pressure (kg/cm²g, psig) | 71.4 | 31.5 | 30.1 | 29.2 | 1.0 |
| Temperature (C.) | 30 | 350 | 228 | 40 | 40 |
| Mass Flow Rate (kg/h) | 37,000.0 | 153,337.8 | 153,337.8 | 90,275.3 | 62,159.8 |
| Molar Flow Rate (kmol/h) | 2,306.3 | 11,739.7 | 11,739.7 | 8,248.5 | 1,412.4 |
| Lower Heating Value (LHV, kJ/kg) | 50,034.9 | 13,888.2 | 13,673.0 | 23,220.0 | 0.0 |

|  | Stream No. | | | |
| --- | --- | --- | --- | --- |
|  | 6 | 7 | 8 | 9 |
| Pressure (kg/cm²g, psig) | 28.1 | 28.1 | 0.4 | 0.0 |
| Temperature (C.) | 40 | 40 | 40.0 | 110.0 |
| Mass Flow Rate (kg/h) | 28,115.5 | 10,119.1 | 17,996.5 | 341,692.8 |
| Molar Flow Rate (kmol/h) | 6,836.0 | 4,985.0 | 1,851.1 | 12,539.5 |
| Lower Heating Value (LHV, kJ/kg) | 74,768.4 | 119,356.9 | 50,282.8 | 0.0 |

Compositions in units of mole fraction for the steams in FIG. 1 are shown in Table 2 below:

TABLE 2

|  | Stream No. | | | | |
| --- | --- | --- | --- | --- | --- |
|  | 1 | 2 | 3 | 4 | 5 |
| Carbon Monoxide | 0.000 | 0.071 | 0.002 | 0.003 | 0.000 |
| Hydrogen | 0.000 | 0.436 | 0.505 | 0.718 | 0.000 |
| Carbon Dioxide | 0.000 | 0.056 | 0.125 | 0.177 | 1.000 |
| Water | 0.000 | 0.367 | 0.299 | 0.003 | 0.000 |
| Methane | 1.000 | 0.070 | 0.070 | 0.099 | 0.000 |
| Oxygen | 0.000 | 0.000 | 0.000 | 0.000 | 0.000 |
| Nitrogen | 0.000 | 0.000 | 0.000 | 0.000 | 0.000 |
| Argon | 0.000 | 0.000 | 0.000 | 0.000 | 0.000 |
| Hydrogen Sulfide | 0.1 ppmv | 0.000 | 0.000 | 0.000 | 0.000 |

|  | Stream No. | | | |
| --- | --- | --- | --- | --- |
|  | 6 | 7 | 8 | 9 |
| Carbon Monoxide | 0.004 | 0.000 | 0.013 | 0.000 |
| Hydrogen | 0.867 | 0.999 | 0.511 | 0.000 |
| Carbon Dioxide | 0.006 | 0.000 | 0.024 | 0.070 |
| Water | 0.003 | 0.000 | 0.013 | 0.207 |
| Methane | 0.120 | 0.001 | 0.439 | 0.000 |
| Oxygen | 0.000 | 0.000 | 0.000 | 0.019 |
| Nitrogen | 0.000 | 0.000 | 0.000 | 0.695 |
| Argon | 0.000 | 0.000 | 0.000 | 0.009 |
| Hydrogen Sulfide | 0.000 | 0.000 | 0.000 | 0.000 |

As can be seen, in Table 2, the composition of stream 8 includes hydrogen in an amount of 0.511 mole fraction, or 51.1 mol % hydrogen. The amount of carbon dioxide was only 0.024 mole fraction, or 2.4 mol %. Because a larger amount of hydrogen was part of stream 8 than conventionally used as fuel for the steam methane reformer 110 (see Example 2), the amount of carbon dioxide in flue gas stream 9 was 0.070 mole fraction, or 7.0 mol %.

Example 2

Figure 3:
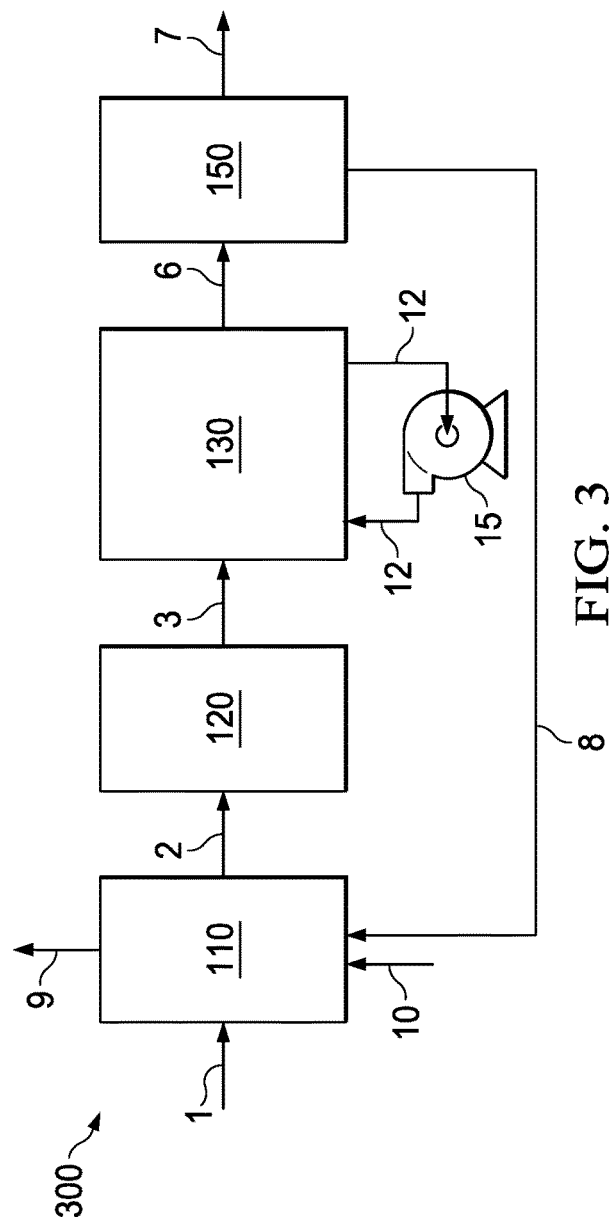
FIG. 3 illustrates a process and system for producing hydrogen from natural gas, without the pre-combustion carbon dioxide removal of FIG. 1.

Example 2 used the process and system 300 of FIG. 3. In FIG. 3, the system 300 uses the steam methane reformer 110, the water gas shift unit 120, the gas cooling unit 130, and the pressure swing absorption unit 150. Different from the system 100 in FIG. 1, the system 300 in FIG. 3 does not include the absorption unit 140 and streams 4 and 5. Instead, stream 6 is coupled to the outlet of the gas cooling unit 130 and to the inlet of the pressure swing absorption unit 150.

The steam methane reformer 110 in system 300 of Example 2 had a radian absorbed duty of 112,656 kW. The pressure swing absorption unit 150 in Example 2 had a recovery of 88%. The steam/CO ratio in stream 2 of system 300 in Example 2 was 4.0.

Selected conditions for the streams in FIG. 3 are shown in Table 3 below:

TABLE 3

|  | Stream No. | | | | |
| --- | --- | --- | --- | --- | --- |
|  | 1 | 2 | 3 | 6 | 7 |
| Pressure (kg/cm²g, psig) | 71.4 | 31.5 | 30.1 | 29.1 | 28.9 |
| Temperature (C.) | 30 | 350 | 227 | 40 | 40 |
| Mass Flow Rate (kg/h) | 26,547.7 | 145,794.6 | 145,794.6 | 77,356.6 | 10,114.4 |
| Molar Flow Rate (kmol/h) | 1,654.8 | 11,114.5 | 11,114.5 | 7,326.5 | 4,984.7 |
| Lower Heating Value (LHV, kJ/kg) | 50,034.9 | 10,938.1 | 10,716.1 | 20,192.4 | 119,388.8 |

TABLE 3-continued

| | Stream No. | | | |
|---|---|---|---|---|
| | 8 | 9 | 10 | 11 |
| Pressure (kg/cm$^2$g, psig) | 0.4 | 0.0 | 0.4 | 0.4 |
| Temperature (C.) | 40.0 | 682.2 | 30.0 | 16.5 |
| Mass Flow Rate (kg/h) | 67,242.2 | 492,960.8 | 15,000.0 | 82,242.1 |
| Molar Flow Rate (kmol/h) | 2,341.8 | 17,104.4 | 935.0 | 3,276.8 |
| Lower Heating Value (LHV, kJ/kg) | 5,271.6 | 0.0 | 50,035.0 | 13,435.9 |

Compositions in units of mole fraction for the steams in FIG. 3 are shown in Table 4 below:

TABLE 4

| | Stream No. | | | | |
|---|---|---|---|---|---|
| | 1 | 2 | 3 | 6 | 7 |
| Carbon Monoxide | 0.000 | 0.073 | 0.002 | 0.003 | 0.000 |
| Hydrogen | 0.000 | 0.438 | 0.509 | 0.772 | 0.999 |
| Carbon Dioxide | 0.000 | 0.055 | 0.126 | 0.190 | 0.000 |
| Water | 0.000 | 0.413 | 0.342 | 0.003 | 0.000 |
| Methane | 1.000 | 0.021 | 0.021 | 0.032 | 0.001 |
| Oxygen | 0.000 | 0.000 | 0.000 | 0.000 | 0.000 |
| Nitrogen | 0.000 | 0.000 | 0.000 | 0.000 | 0.000 |
| Argon | 0.000 | 0.000 | 0.000 | 0.000 | 0.000 |
| Hydrogen Sulfide | 0.1 ppmv | 0.000 | 0.000 | 0.000 | 0.000 |

| | Stream No. | | | |
|---|---|---|---|---|
| | 8 | 9 | 10 | 11 |
| Carbon Monoxide | 0.009 | 0.000 | 0.000 | 0.006 |
| Hydrogen | 0.290 | 0.000 | 0.000 | 0.207 |
| Carbon Dioxide | 0.594 | 0.151 | 0.000 | 0.425 |
| Water | 0.009 | 0.177 | 0.000 | 0.006 |
| Methane | 0.098 | 0.000 | 1.000 | 0.355 |
| Oxygen | 0.000 | 0.017 | 0.000 | 0.000 |
| Nitrogen | 0.000 | 0.647 | 0.000 | 0.000 |
| Argon | 0.000 | 0.008 | 0.000 | 0.000 |
| Hydrogen Sulfide | 0.000 | 0.000 | 0.000 | 0.000 |

As can be seen, in Table 4, the composition of stream 8 includes hydrogen in an amount of 0.290 mole fraction, or 29.9 mol % hydrogen. The amount of carbon dioxide in stream 8 was 0.594 mole fraction, or 59.4 mol %. The amount of carbon dioxide in flue gas stream 9 was 0.151 mole fraction, or 15.1 mol %. There is no carbon dioxide recovery, or carbon capture, in Example 2 because there is no stream dedicated for carbon dioxide recovery. Thus, carbon dioxide recovery in Example 2 is zero.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 90, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

ADDITIONAL DISCLOSURE

Embodiment 1 is a process comprising introducing a feed natural gas, a feed steam, and a fuel to a steam methane reformer to produce unshifted synthesis gas (syngas); introducing the unshifted syngas to a water gas shift unit to produce a shifted syngas; removing $CO_2$ from the shifted syngas to produce a $CO_2$ depleted syngas and a $CO_2$ product; introducing the $CO_2$ depleted syngas to a pressure swing absorption unit to produce a hydrogen product and an off-gas comprising carbon monoxide, carbon dioxide, unreacted methane, and at least 25 mol % hydrogen based on a total moles of components in the off-gas, wherein the fuel that is introduced to the steam methane reformer comprises the off-gas.

Embodiment 2 is the process of Embodiment 1, wherein 1) the fuel that is introduced to the steam methane reformer consists of the off-gas; and/or 2) the off-gas comprises less than 60 mol % carbon dioxide based on a total moles of components in the off-gas.

Embodiment 3 is the process of Embodiment 1 or 2, wherein removing carbon dioxide from the shifted syngas comprises: absorbing $CO_2$ with a lean physical solvent to produce the $CO_2$ depleted syngas and a $CO_2$ enriched physical solvent; and flashing the $CO_2$ enriched physical solvent to produce the $CO_2$ product and the lean physical solvent, optionally wherein equipment used for absorbing and flashing is made of carbon steel and not stainless steel, and optionally wherein no steam is used in the steps of absorbing and flashing.

Embodiment 4 is the process of Embodiment 1 or 2, wherein removing carbon dioxide from the shifted syngas comprises: absorbing $CO_2$ with a lean amine solvent to produce the $CO_2$ depleted syngas and a $CO_2$ enriched amine solvent; and stripping the $CO_2$ enriched amine solvent to produce the $CO_2$ product and the lean amine solvent.

Embodiment 5 is the process of any of Embodiments 1 to 4 further comprising: before removing $CO_2$ from the shifted syngas, cooling the shifted syngas in a heat exchanger to remove an aqueous condensate from the shifted syngas.

Embodiment 6 is the process of Embodiment 5, further comprising: removing the aqueous condensate from a shifted syngas side of the heat exchanger; introducing the aqueous condensate to a coolant side of the heat exchanger; and producing a heat exchanger steam in the heat exchanger, wherein the heat exchanger steam is the feed steam that is introduced to the steam methane reformer.

Embodiment 7 is the process of any of Embodiments 1 to 6, wherein the amount of $CO_2$ in the $CO_2$ product comprises greater than about 60 mol % of a sum amount that is the amount of $CO_2$ that is introduced into the process plus the amount of $CO_2$ that is generated in the process.

Embodiment 8 is the process of any of Embodiment 1 to 6, wherein the steam methane reformer produces a flue gas, the process further comprising: cooling the flue gas to produce a cooled flue gas; splitting the cooled flue gas into a first portion and a second portion; compressing the first portion to produce a compressed first portion; removing $CO_2$ from the compressed first portion by amine-based absorption to produce a residual $CO_2$ and a $CO_2$ depleted flue gas; removing $O_2$ from the $CO_2$ depleted flue gas by pressure swing absorption to produce a $N_2$ product.

Embodiment 9 is the process of Embodiment 8, wherein a first sum amount that is the amount of $CO_2$ in the $CO_2$ product plus the amount of $CO_2$ in the residual $CO_2$ is in a range of from about 60 mol % to about 95 mol % of a second sum amount that is the amount of $CO_2$ that is introduced into the process plus the amount of $CO_2$ that is generated in the process.

Embodiment 10 is a hydrogen production system comprising: a steam methane reformer configured to contact methane and steam with a catalyst to form an unshifted syngas; a water gas shift unit coupled to the steam methane reformer and configured to receive the unshifted syngas from the steam methane reformer and to produce a shifted syngas; an absorption unit coupled to the water gas shift unit and configured to receive the shifted syngas, remove carbon dioxide from the shifted syngas, and produce a $CO_2$ depleted syngas and a $CO_2$ product; a pressure swing absorption unit coupled to the absorption unit, wherein the pressure swing absorption unit is configured to receive the $CO_2$ depleted syngas from the absorption unit and to produce a hydrogen product and an off-gas; and an off-gas stream coupled to the pressure swing absorption unit and to the steam methane reformer, wherein the off-gas stream is configured to receive the off-gas from the pressure swing absorption unit and to introduce the off-gas to the steam methane reformer, wherein the off-gas in the off-gas stream comprises carbon monoxide, carbon dioxide, unreacted methane, and at least 25 mol % hydrogen based on a total moles of components in the off-gas stream.

Embodiment 11 is the system of Embodiment 10, further comprising: a heat exchanger coupled to the water gas shift unit and to the steam methane reformer, wherein the heat exchanger is configured to receive the shifted syngas from the water gas shift unit, to cool the shifted syngas, to remove an aqueous condensate from the shifted syngas, and to provide the shifted syngas without the aqueous condensate for introduction to the absorption unit.

Embodiment 12 is the system of Embodiment 11, further comprising: a coolant stream having an end coupled to a shifted syngas side of the heat exchanger and an opposite end coupled to a coolant side of the heat exchanger, wherein the coolant stream is configured to remove the aqueous condensate from the shifted syngas side of the heat exchanger and to introduce the aqueous condensate to the coolant side of the heat exchanger, wherein the heat exchanger is configured to heat the aqueous condensate to produce a heat exchanger steam, wherein the heat exchanger steam is fed to the steam methane reformer.

Embodiment 13 is the system of any of Embodiments 10 to 12, wherein the absorption unit comprises: an absorber having a lean physical solvent configured to absorb carbon dioxide from the shifted syngas to produce a $CO_2$ enriched solvent and the $CO_2$ depleted syngas; and one or more flash tanks coupled to the absorber, wherein the one or more flash tanks is configured to receive the $CO_2$ enriched solvent from the absorber and to flash carbon dioxide from the $CO_2$ enriched solvent to produce the lean physical solvent and the $CO_2$ product; optionally wherein the absorption unit is made of carbon steel and not stainless steel, and optionally wherein no steam is used in the absorption unit.

Embodiment 14 is the system of any of Embodiments 10 to 12, wherein the absorption unit comprises: an absorber having a lean chemical solvent configured to absorb carbon dioxide from the shifted syngas to produce a $CO_2$ enriched solvent and the $CO_2$ depleted syngas; and a stripper coupled to the absorber, wherein the stripper is configured to receive the $CO^2$ enriched solvent from the absorber and to strip carbon dioxide from the $CO_2$ enriched solvent to produce the lean chemical solvent and the $CO_2$ product.

Embodiment 15 is the system of any of Embodiments 10 to 14, wherein the amount of $CO_2$ in the $CO_2$ product comprises greater than about 60% of a sum amount that is the amount of $CO_2$ that is introduced into the system plus the amount of $CO_2$ that is generated in the system.

Embodiment 16 is the embodiment of any of Embodiments 10 to 14, further comprising: a heat exchanger coupled to the steam methane reformer and configured to receive a flue gas from the steam methane reformer and to cool the flue gas to produce a cooled flue gas; a splitter coupled to the heat exchanger and configured to split the cooled flue gas into a first portion and a second portion; a compressor coupled to the splitter and configured to compress the first portion to produce a compressed first portion; and a second absorption unit coupled to the compressor and configured to receive the compressed first portion, contact the first portion with a lean amine-based solvent, and to produce a residual $CO_2$ and a $CO_2$ depleted flue gas.

Embodiment 17 is the system of Embodiment 16, wherein a first sum amount that is the amount of $CO_2$ in the $CO_2$ product plus the amount of $CO_2$ in the residual $CO_2$ is in a range of from about 60 mol % to about 95 mol % of a second sum amount that is the amount of $CO_2$ that is introduced into the system plus the amount of $CO_2$ that is generated in the system.

Embodiment 18 is the system of any of Embodiments 16-17, further comprising: a second pressure swing absorption unit coupled to the second absorption unit and configured to receive the $CO_2$ depleted flue gas from the second absorption unit, remove $O_2$ from the $CO_2$ depleted flue gas by pressure swing absorption, and to produce a $N_2$ product.

Embodiment 19 is the system of any of Embodiments 10-18, wherein the off-gas in the off-gas stream comprises at least 30 mol % hydrogen based on a total moles of components in the off-gas stream.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for producing hydrogen from natural gas, the process comprising:
   introducing a feed natural gas, a feed steam, and a fuel to a steam methane reformer to produce unshifted synthesis gas (syngas);
   introducing the unshifted syngas to a water gas shift unit;
   producing a cooled shifted syngas;
   removing $CO_2$ from the cooled shifted syngas to produce a $CO_2$ depleted syngas and a $CO_2$ product; and
   introducing the $CO_2$ depleted syngas to a pressure swing absorption unit to produce a hydrogen product and an off-gas comprising carbon monoxide, carbon dioxide, unreacted methane, and at least 25 mol % hydrogen based on a total moles of components in the off-gas, wherein the fuel that is introduced to the steam methane reformer comprises the off-gas.

2. The process of claim 1, wherein the fuel that is introduced to the steam methane reformer consists of the off-gas.

3. The process of claim 1, wherein the off-gas comprises less than 60 mol % carbon dioxide based on a total moles of components in the off-gas.

4. The process of claim 1, wherein removing carbon dioxide from the cooled shifted syngas comprises:
   absorbing $CO_2$ with a lean physical solvent to produce the $CO_2$ depleted syngas and a $CO_2$ enriched physical solvent; and
   flashing the $CO_2$ enriched physical solvent to produce the $CO_2$ product and the lean physical solvent,
   optionally wherein equipment used for absorbing and flashing is made of carbon steel and not stainless steel, and
   optionally wherein no steam is used in the steps of absorbing and flashing.

5. The process of claim 1, wherein removing carbon dioxide from the cooled shifted syngas comprises:
   absorbing $CO_2$ with a lean amine solvent to produce the $CO_2$ depleted syngas and a $CO_2$ enriched amine solvent; and
   stripping the $CO_2$ enriched amine solvent to produce the $CO_2$ product and the lean amine solvent.

6. The process of claim 1, wherein an amount of $CO_2$ in the $CO_2$ product comprises greater than about 60 mol % of a sum amount that is an amount of $CO_2$ that is introduced into the process plus an amount of $CO_2$ that is generated in the process.

7. A hydrogen production system comprising:
   a steam methane reformer configured to contact methane and steam with a catalyst to form an unshifted syngas;
   a water gas shift unit coupled to the steam methane reformer and configured to receive the unshifted syngas from the steam methane reformer and to produce a shifted syngas;
   an absorption unit comprising an absorber and a regenerator coupled to the water gas shift unit and configured to receive the shifted syngas, remove carbon dioxide from the shifted syngas, and produce a $CO_2$ depleted syngas and a $CO_2$ product wherein the regenerator comprises a flash vessel, wherein;
   the absorber has a lean physical solvent configured to absorb carbon dioxide from the shifted syngas to produce a $CO_2$ enriched solvent and the $CO_2$ depleted syngas; and
   the regenerator comprises the flash vessel comprising one or more flash columns or flash tanks coupled to the absorber, wherein the one or more flash tanks is configured to receive the $CO_2$ enriched solvent from the absorber and to flash carbon dioxide from the $CO_2$ enriched solvent to produce the lean physical solvent and the $CO_2$ product;
   a pressure swing absorption unit coupled to the absorption unit, wherein the pressure swing absorption unit is configured to receive the $CO_2$ depleted syngas from the absorption unit and to produce a hydrogen product and an off-gas; and
   an off-gas stream coupled to the pressure swing absorption unit and to the steam methane reformer, wherein the off-gas stream is configured to receive the off-gas from the pressure swing absorption unit and to introduce the off-gas to the steam methane reformer, wherein the off-gas in the off-gas stream comprises carbon monoxide, carbon dioxide, unreacted methane, and at least 25 mol % hydrogen based on a total moles of components in the off-gas stream.

8. The hydrogen production system of claim 7, wherein the flash vessel is at a vacuum pressure to about 1.38 MPag.

9. The hydrogen product system of claim 8, wherein the flash vessel is at a pressure of no more than about 1.38 MPag.

10. The hydrogen product system of claim 9, wherein the flash vessel comprises a flash tank.

11. A process for producing hydrogen from natural gas, the process comprising:
   producing a flue gas from a steam methane reformer;
   cooling the flue gas to produce a cooled flue gas;
   splitting the cooled flue gas into a first portion and a second portion;
   compressing the first portion to produce a compressed first portion;
   removing $CO_2$ from the compressed first portion by an amine-based absorption to produce a residual $CO_2$ and a $CO_2$ depleted flue gas; and removing $O_2$ from the $CO_2$ depleted flue gas by a pressure swing absorption to produce a $N_2$ product.

12. The process of claim 11, wherein a first sum amount that is an amount of $CO_2$ in a $CO_2$ product plus an amount of $CO_2$ in the residual $CO_2$ is in a range of from about 60 mol % to about 95 mol % of a second sum amount that is an amount of $CO_2$ that is introduced into the process plus an amount of $CO_2$ that is generated in the process.

13. The process of claim 11, further comprising providing about 2 to about 10 pressure swing absorption units.

\* \* \* \* \*